United States Patent [19]

Shiotsuki et al.

[11] Patent Number: 5,450,473
[45] Date of Patent: Sep. 12, 1995

[54] METHOD AND ARRANGEMENT OF EFFECTIVELY REDUCING SIGNAL STRENGTH MEASUREMENTS FOR A HANDOFF IN A CELLULAR MOBILE COMMUNICATIONS SYSTEM

[75] Inventors: Hirofumi Shiotsuki; Kenji Yamaguchi, both of Tokyo, Japan

[73] Assignee: NEC Corporation, Tokyo, Japan

[21] Appl. No.: 180,299

[22] Filed: Jan. 12, 1994

[30] Foreign Application Priority Data

Jan. 12, 1993 [JP] Japan .................................. 5-002989

[51] Int. Cl.⁶ ...................... H04Q 7/22; H04M 11/00
[52] U.S. Cl. ........................................ 379/60; 379/63;
379/59; 455/33.2; 455/54.2
[58] Field of Search ............................ 379/59, 60, 63;
455/33.1, 33.2, 34.1, 51.1, 54.1, 56.1; 370/95.1,
95.3, 110

[56] References Cited

U.S. PATENT DOCUMENTS

| | | | |
|---|---|---|---|
| 4,737,978 | 4/1988 | Burke et al. | 379/60 |
| 4,881,271 | 11/1989 | Yamauchi et al. | 379/59 |
| 5,161,249 | 11/1992 | Meche et al. | 455/33.3 |
| 5,200,957 | 4/1993 | Dahlin | 370/95.1 |
| 5,327,575 | 7/1994 | Merich et al. | 379/60 |
| 5,392,453 | 2/1995 | Gudmundson et al. | 455/56.1 |

*Primary Examiner*—Curtis Kuntz
*Assistant Examiner*—William G. Trost
*Attorney, Agent, or Firm*—Sughrue, Mion, Zinn, Macpeak & Seas

[57] ABSTRACT

In order to reduce the number of measurements of signal strength for implementing a handoff of a mobile unit located in a given land site, a strength of a signal transmitted from said mobile unit is measured at the land site. Further, the land site measures a level crossing rate based on the signal transmitted from the mobile to be handed off. The land site applies a handoff request to a MTSO if the land site detects that the measured signal strength falls below a predetermined handoff threshold. The handoff request includes information indicating the level crossing rate. The MTSO compares the level crossing rate with a predetermined value, and determine a plurality of land sites each of which is to measure the signal strength for implementing a handoff according to the comparison result.

4 Claims, 5 Drawing Sheets

METHOD AND ARRANGEMENT OF EFFECTIVELY REDUCING SIGNAL STRENGTH MEASUREMENTS FOR A HANDOFF IN A CELLULAR MOBILE COMMUNICATIONS SYSTEM

BACKGROUND OF THE INVENTION

1. Field of the Invention

The present invention relates generally to improvements in a cellular mobile communications system, and more specifically to a method and arrangement of effectively reducing the number of electric field strength measurements which are required for a handoff in such a communications system. The present invention finds extensive use in the case where a service zone (viz., cell) is sub-divided into smaller ones in order to meet increase in the number of cellular subscribers.

2. Description of Related Art

It is well known in the art to apply frequency reuse in a mobile communications system in order to satisfy various objectives such as large subscriber capacity, efficient spectrum use, widespread availability, adaptability to traffic density, etc.

Frequency reuse refers to the use of the same radio carrier frequency in a number of different channels to cover different areas which are separated from one another by distances sufficient that objectionable co-channel interference does not occur. The so called cellular mobile communications system utilizes such a concept.

When a mobile unit, during a call, moves out of the service coverage of a particular land site, the signal strength measured at the particular land site falls below a handoff threshold level. Thus, the present land site requests a MTSO (Mobile Telephone Switching Office) to implement a handoff or switch over the mobile unit to another suitable nearby land site. The MTSO, in response to the handoff request, instructs the neighboring land sites to measure the strength of the signal transmitted from the mobile unit to be handed off.

After each of the nearby land sites completes measuring the signal strength of the mobile unit to be handed off, the land site informs the MTSO of the results. The MTSO checks the results which are received and then implements a handoff if there is a land site to which the mobile unit can be suitably handed off.

On the other hand, in order to meet the ever increasing number of cellular subscribers, it is a current practice to subdivide each cell into smaller ones (viz., so-called micro-cells).

This cell subdividing, however, inevitably increases the total number of handoff requests. In addition to this, upon a handoff request being generated from a given land site, the MTSO has to instruct the signal strength measurement for the handoff to the land sites the number of which is relatively large as compared with the case where the cell is not subdivided. In more specific terms, the MTSO is required to implement a handoff without failure even though a mobile unit moves at a high speed from cell to cell without cutting off communication. Accordingly, the MTSO instructs a relatively large number of land sites which includes, in addition to the land sites surrounding the land site which issued a handoff request, another land sites which are located outside the surrounding ones.

The increase in the number of the signal strength measurements for a handoff, undesirably renders complex the overall system arrangement because of the increase in the number of traffics for measuring the signal strength for the handoff.

It is therefore highly desirable to reduce the number of signal strength measurements in the case where a mobile unit moves at a low speed.

SUMMARY OF THE INVENTION

It is an object of the present invention to provide a method of effectively reducing the number of signal strength measurements for a handoff in a cellular mobile communications system.

Another object of the present invention is to provide an arrangement of effectively reducing the number of signal strength measurements for a handoff in a cellular mobile communications system.

In brief, the object is achieved by improvements wherein in order to reduce the number of measurements of signal strength for implementing a handoff of a mobile unit located in a given land site, a strength of a signal transmitted from said mobile unit is measured at the land site. Further, the land site measures a level crossing rate based on the signal transmitted from the mobile to be handed off. The land site applies a handoff request to a MTSO if the land site detects that the measured signal strength falls below a predetermined handoff threshold. The handoff request includes information indicating the level crossing rate. The MTSO compares the level crossing rate with a predetermined value, and determine a plurality of land sites each of which is to measure the signal strength for implementing a handoff according to the comparison result.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 1:
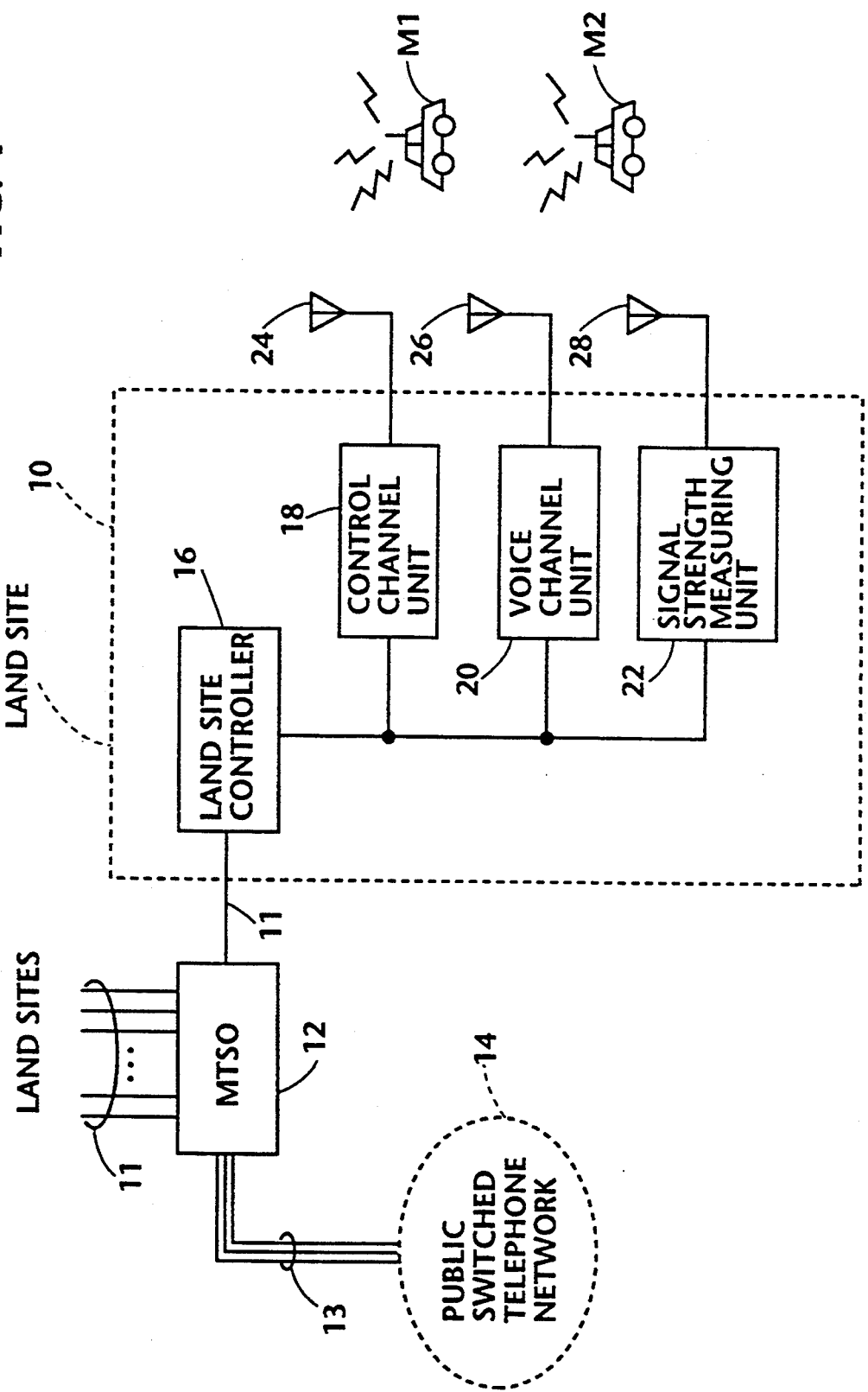
FIG. 1 is a block diagram schematically showing a cellular mobile communications system to which the present invention is applicable.

Referring now to FIG. 1, wherein there is schematically shown a cellular mobile communications system to which the present invention is applicable. The system shown in FIG. 1 includes a land site 10, a MTSO 12, a public switched telephone network 14, and mobile units M1 and M2.

The land site 10 is arranged to apply a handoff request to the MTSO 12 in the event that a mobile unit located in the service area thereof is to be handed off.

A plurality of land sites, including the land site 10, are connected by land channels 11 to the MTSO 12 which is in turn connected by trunks 13 to the public switched telephone network 14. Each of the land channels 11 includes control and voice channels. The MTSO 12 supervises and controls the entire operation of the system, including the assignment of voice channels and the changing of frequencies during a handoff.

If the mobile unit M1 (for example) wishes to make a call with a party in the public switched telephone network 14 or another mobile unit, the call is established using the land site controller 16 and the control channel unit 18 under the control of the MTSO 12. Following this, speech is made possible via the voice channel 20.

It is assumed that: (a) a mobile unit (not shown) located in a given land site (denoted by LSx for the convenience of description) requires "handing off" and (b) the land site 10 is in the vicinity of the land site LSx. The MTSO 12 receives a handoff request sent from the land site LSx and subsequently instructs the land site 10 to measure the strength level of a signal received from the mobile unit in the nearby land site LSx. The land site controller 16, in response to the signal strength measurement instruction from the MTSO 12, induces a signal strength measuring unit 22 to measure the strength of a signal from the mobile unit which is located in the land site LSx and to be handed off. The measurement result obtained at the unit 22 is fed back to the MTSO 12 via the land site controller 16.

FIG. 1 shows only one voice channel unit 20. However, more than two units 20 can be provided. This holds for the measuring unit 22.

Figure 2:
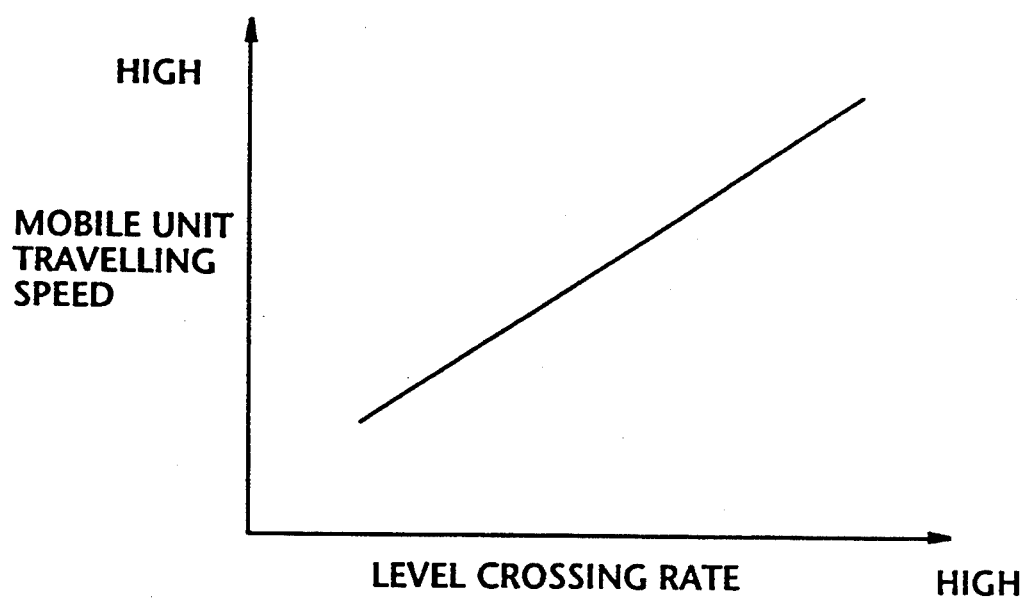
FIG. 2 depicts graphical data which shows the relationship between a mobile unit travelling speed and a level crossing rate.

FIG. 2 is a plot schematically showing the relationship between the level crossing rates and the mobile unit travelling speed. As is well known in the art, the level crossing rate at a specified signal level is defined as the average number of times per second that the signal envelop crosses the level in a positive-going direction. Further, it is known that the level crossing rate is proportional to the mobile unit travelling speed, as shown in FIG. 2 and thus the travelling speed of a mobile unit can be detected by measuring the level crossing rate of the signal transmitted therefrom. In this case, it should be noted that the relationship of FIG. 2 can be applied to any direction of mobile unit travel (movement).

If a mobile unit is to be handed off at a given cell while moving therewithin at a high speed, it is likely that when the handoff is to be implemented, the mobile unit has passed through one of the surrounding cells and enters another cell outside the surrounding cells. On the contrary, if the mobile unit travels at a low speed, it is expected that the mobile unit can be handed off at one of the surrounding cells.

Figure 3:
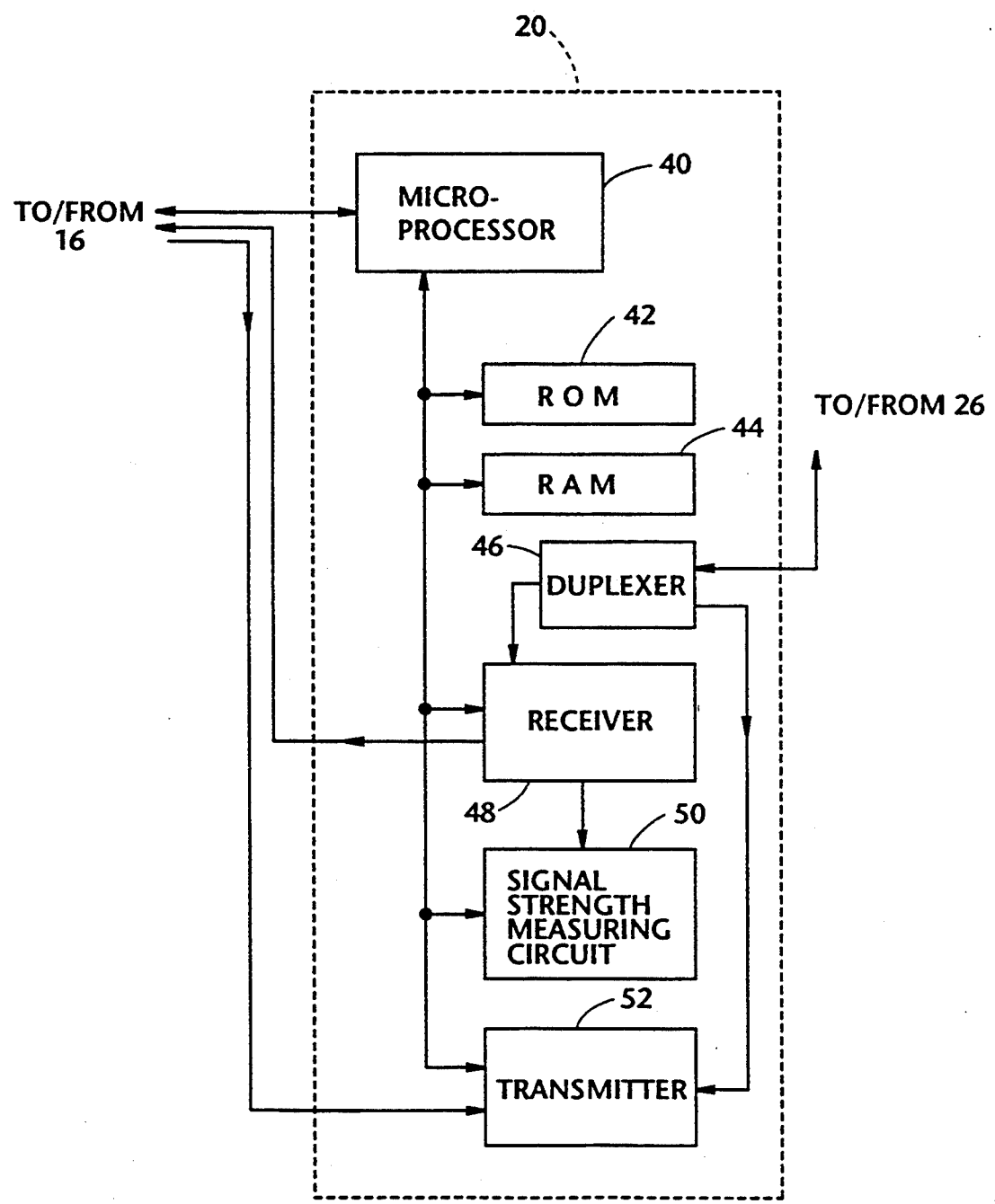
FIG. 3 is block diagram showing in detail one of the blocks shown in FIG. 1, which block is concerned with the present invention.

FIG. 3 shows, in block diagram form, the detail of the voice channel unit 20.

As shown in FIG. 3, the unit 20 includes a microprocessor 40, a ROM (Read Only Memory) 42, a RAM (Random Access Memory) 44, a duplexer 46, a receiver 48, a signal strength measuring circuit 50, and a transmitter 52, all of which are coupled as shown. The blocks 40, 48 and 52 are coupled to the land site controller 16 (FIG. 1), while the duplexer 46 is coupled to the antenna 26 (FIG. 1).

Merely for the convenience of exemplary description, let it be assumed that the mobile unit M1 is to be handed off to a given nearby land site (not shown).

The microprocessor 40 controls the overall operations of the voice channel unit 20 using a program stored in the ROM. The intensity of the voice signal transmitted from the mobile unit M1 is measured at the signal strength measuring circuit 50. In more specific terms, the receiver 48 is supplied with the incoming signal via the duplexer 46 and applies an IF (Intermediate Frequency) signal to the unit 50 at which the signal strength is detected in a conventional manner. The microprocessor 40 measures the level crossing rate based on the intensity of the voice signal which is transmitted from the mobile unit M1 and detected at the signal strength measuring circuit 50. Measuring the level crossing rate itself is well known in the art and hence the description thereof will be omitted for the sake of brevity. The signal strength and the level crossing rate are constantly measured while the land site 10 communicates with a mobile unit(s) located in the service area thereof. The RAM 44 is used as a working memory when determining the level crossing rate and storing intermediate results during the operations. The transmitter 52 is not directly related to the instant invention and as such the discussion thereof will be omitted.

Although not shown in FIG. 1, the MTSO 12 includes a comparator and a controller for imprementing the operations of the present invention. As will be seen from the following descriptions, the comparator is arranged to compare a level crossing rate, applied from a land site which includes a mobile unit to be handed off, with a predetermined value. That is, the comparison determines whether or not the mobile unit to be handed off moves in excess of a predetermined speed.

The operations of the instant embodiment will be discussed with reference to FIGS. 4 and 5.

Figure 4:
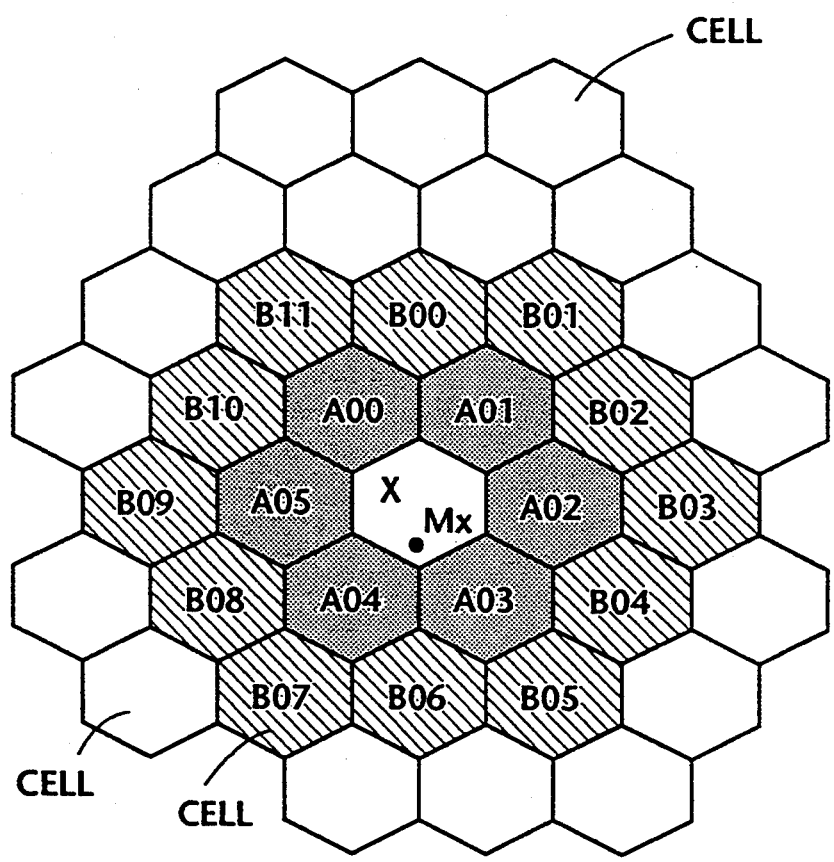
FIG. 4 is a diagram schematically showing a plurality of cells for discussing a preferred embodiment of the present invention.

FIG. 4 is a diagram schematically showing a plurality of cells wherein a center cell depicted by "X" includes a mobile unit Mx which is represented by a black circle. The cell X is surrounded by a group of cells A00-A05 which are in turn surrounded by another group of cells B00-B11 in this particular embodiment. FIG. 4 further illustrates a plurality of cells, outside the group of cells B00-B11, which are not labelled.

Each of the cells shown in FIG. 4 is coupled to the MTSO 12 although not shown merely for the sake of simplifying the illustration.

It is assumed that the mobile unit Mx located in the cell X is subjected to the conditions which require a handoff to another nearby land site.

Figure 5:
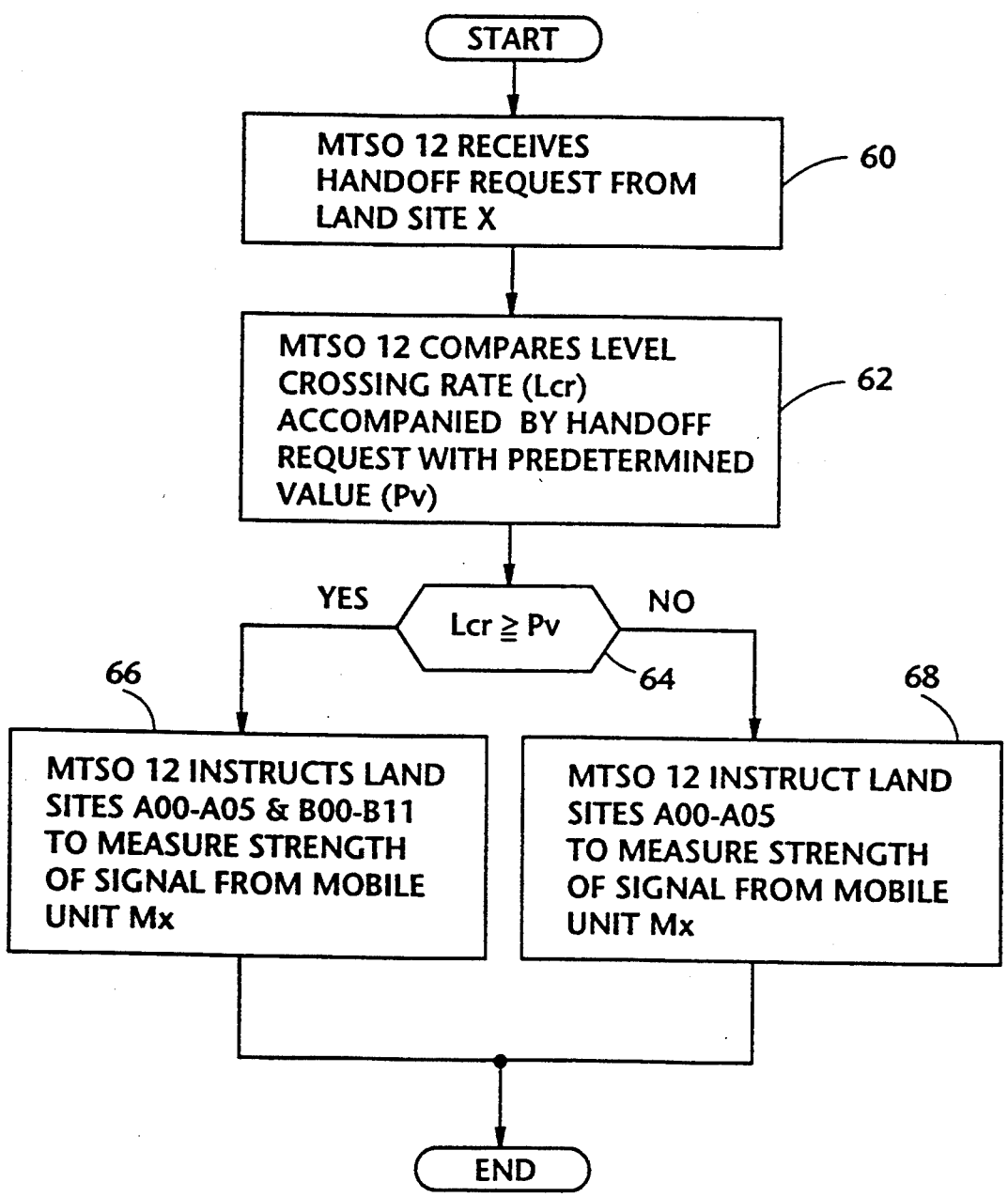
FIG. 5 is a flow chart which depicts the operations which characterize the present invention.

In such a case, at step 60 of FIG. 5, the MTSO receives, from the cell X, a handoff request which includes a level crossing rate which was measured based on the signal transmitted from the mobile unit Mx. Subsequently, at step 62, the MTSO 12 compares the level crossing rate (Lcr), which was accompanied by the handoff request from the cell X, with a predetermined value (Pv).

If the MTSO 12 determines that Lcr exceeds Pv, the MTSO 12 instructs the lands sites A00-A05 and B00-B11 to measure the strength of the signal transmitted from the mobile unit Mx (step 66). In contrast, If the MTSO 12 determined that Lcr does not reach Pv, the MTSO 12 instructs only the lands sites A00-A05 to measure the strength of the signal transmitted from the mobile unit Mx (step 68).

The above mentioned predetermined value can be determined by way of empirical data derived by field work investigation or practical measurements.

As discussed above, the land sites which are instructed to implement the signal intensity measurements for a handoff, are determined by a mobile unit's travelling speed.

It will be understood that the above disclosure is representative of only two possible embodiments and that various modifications can be made without departing from the concept of the invention.

What is claimed is:

1. A method of reducing the number of measurements of signal strength for implementing a handoff of a mobile unit located in a first land site in a cellular mobile communications system, said handoff being controlled by a MTSO (Mobile Telephone Switching Office) included in said cellular mobile communications system, said method comprising the steps of:
    (a) measuring a strength of a signal transmitted from said mobile unit at said first land site;
    (b) measuring a level crossing rate based on said signal transmitted from said mobile at said first land site;
    (c) applying a handoff request from said first land site to said MTSO if said first land site detects that the strength of said signal from said mobile unit falls below a predetermined handoff threshold, said handoff request including information indicating level crossing rate;
    (d) comparing said level crossing rate with a predetermined value at said MTSO; and
    (e) selecting, at said MTSO, between at least a first plurality of land sites and a second plurality of land sites, said second plurality comprising at least some of said first plurality of land sites, each of said first and second plurality of land sited being operative to measure said signal strength for implementing said handoff according to a comparison result obtained in step (d).

2. A method of reducing the number of measurements of signal strength for implementing a handoff of a mobile unit located in a first land site in a cellular mobile communications system, said handoff being controlled by a MTSO (Mobile Telephone Switching Office) included in said cellular mobile communications system, said method comprising the steps of:
    (a) measuring a strength of a signal transmitted from said mobile unit at said first land site;
    (b) measuring a level crossing rate based on said signal transmitted from said mobile at said first land site;
    (c) applying a handoff request from said first land site to said MTSO if said first land site detects that the strength of said signal from said mobile unit falls below a predetermined handoff threshold, said handoff request including information indicating level crossing rate;
    (d) comparing said level crossing rate with a predetermined value at said MTSO; and
    (e) determining, at said MTSO, a plurality of land sites each of which is to measure said signal strength for implementing said handoff according to a comparison result obtained in step (d);
    wherein if the land crossing rate is less than the predetermined value, then said plurality of land sites for measuring said signal strength are a second group of land sites each of which borders said first land site, and
    wherein if the land crossing rate is greater than or equal to the predetermined value, then said plurality of land sites for measuring said signal strength are a third group of land sites including the land sites included in the second group and additional land sites which border said second group of land sites 3. An arrangement for reducing the number of measurements of signal strength for implementing a handoff of a mobile unit located in a first land site in a cellular mobile communications system, said handoff being controlled by a MTSO (Mobile Telephone Switching Office) included in said cellular mobile communications system, said arrangement comprising:
    first means for measuring a strength of a signal transmitted from said mobile unit, said first land site including said first means;
    second means for measuring a level crossing rate based on said signal transmitted from said mobile, said first land site including said second means;
    third means for applying a handoff request from said first land site to said MTSO if said first land site detects that the strength of said signal from said mobile unit falls below a predetermined handoff threshold, said handoff request including information indicating level crossing rate, said first land site including said third means;
    fourth means for comparing said level crossing rate with a predetermined value, said MTSO including said fourth means; and
    fifth means for selecting between at least a first plurality of land sites and a second plurality of land sites, said second plurality comprising at least some of said first plurality of land sites, each of said first and second plurality of land sited being operative to measure said signal strength for implementing said handoff according to a comparison result obtained from said fourth means, said MTSO including said fifth means.

4. An arrangement for reducing the number of measurements of signal strength for implementing a handoff of a mobile unit located in a first land site in a cellular mobile communications system, said handoff being controlled by a MTSO (Mobile Telephone Switching Office) included in said cellular mobile communications system, said arrangement comprising:
    first means for measuring a strength of a signal transmitted from said mobile unit, said first land site including said first means;
    second means for measuring a level crossing rate based on said signal transmitted from said mobile, said first land site including said second means;
    third means for applying a handoff request from said first land site to said MTSO if said first land site detects that the strength of said signal from said mobile unit falls below a predetermined handoff threshold, said handoff request including information indicating level crossing rate, said first land site including said third means;
    fourth means for comparing said level crossing rate with a predetermined value, said MTSO including said fourth means; and
    fifth means for determining a plurality of land sites each of which is to measure said signal strength for implementing said handoff according to a comparison result obtained from said fourth means, said MTSO including said fifth means;
    wherein if the land crossing rate is less than the predetermined value, then said plurality of land sites for measuring said signal strength are a second group of land sites each of which borders said first land site, and
    wherein if the land crossing rate is greater than or equal to the predetermined value, then said plurality of land sites for measuring said signal strength are a third group of land sites comprising the land sites included in the second group and additional land sites which border said second group of land sites.

* * * * *

UNITED STATES PATENT AND TRADEMARK OFFICE
CERTIFICATE OF CORRECTION

PATENT NO.    : 5,450,473
DATED         : September 12, 1995
INVENTOR(S)   : Hirofumi SHIOTSUKI and Kenji YAMAGUCHI It is certified that error(s) appears in the above-identified patent and that said Letters Patent is hereby corrected as shown below:

Col. 4, line 21, delete "imprementing" and insert --implementing--.

Col. 5, line 28, delete "sited" and insert --sites--.

Col. 6, linne 25, delete "sited" and insert --sites--.

Signed and Sealed this

Twenty-first Day of May, 1996

*Attest:*

BRUCE LEHMAN

*Attesting Officer*          *Commissioner of Patents and Trademarks*